(12) United States Patent
Yoshizu et al.

(10) Patent No.: US 9,087,123 B2
(45) Date of Patent: Jul. 21, 2015

(54) COLLABORATIVE FILTERING USING EVALUATION VALUES OF CONTENTS FROM USERS

(75) Inventors: Sayaka Yoshizu, Kawasaki (JP); Yoshinori Yokoyama, Yokohama (JP); Naoki Ihara, Musashino (JP); Yuki Kimura, Okegawa (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 384 days.

(21) Appl. No.: 13/512,368

(22) PCT Filed: Dec. 18, 2009

(86) PCT No.: PCT/JP2009/071141
§ 371 (c)(1),
(2), (4) Date: May 29, 2012

(87) PCT Pub. No.: WO2011/074113
PCT Pub. Date: Jun. 23, 2011

(65) Prior Publication Data
US 2012/0239604 A1    Sep. 20, 2012

(51) Int. Cl.
*G06F 17/00* (2006.01)
*G06N 5/02* (2006.01)
*G06F 17/30* (2006.01)

(52) U.S. Cl.
CPC .... *G06F 17/30699* (2013.01); *G06F 17/30029* (2013.01)

(58) Field of Classification Search
None
See application file for complete search history.

(56) References Cited

U.S. PATENT DOCUMENTS

| | | |
|---|---|---|
| 2006/0271691 A1 | 11/2006 | Jacobs et al. |
| 2008/0120339 A1* | 5/2008 | Guan et al. ................. 707/104.1 |
| 2008/0316360 A1 | 12/2008 | Kondo et al. |

FOREIGN PATENT DOCUMENTS

| | | |
|---|---|---|
| CN | 101320461 A | 12/2008 |
| JP | 2005-202540 | 7/2005 |
| JP | 2007-501975 | 2/2007 |
| JP | 2009-266096 | 11/2009 |
| KR | 101330589 | 12/2008 |

OTHER PUBLICATIONS

Su et al. "A Survey of Collaborative Filtering Techniques", Advances in A. I., 2009, pp. 19.*
Symeonidis et al. "Feature-weighted User Model for Recommender Systems", User Modeling, 2007, pp. 10.*
International Search Report in International Application No. PCT/JP2009/071141; Mailing Date: Mar. 2, 2010.
Translation of the International Preliminary Report on Patentability for PCT/JP2009/071141 dated Aug. 9, 2012.

* cited by examiner

*Primary Examiner* — Li-Wu Chang
(74) *Attorney, Agent, or Firm* — Finnegan, Henderson, Farabow, Garrett & Dunner, LLP

(57) ABSTRACT

When there are no evaluation values from a user who has evaluated both contents X and Z, an indirect similarity calculation unit 32 of an arithmetic processing unit 30 of an information processing center 10a indirectly calculates the similarity between the contents X and Z using evaluation values of a content Y whose evaluation value is present from a user who has evaluated both the contents X and Y and whose evaluation value is present from a user who has evaluated both the contents Y and Z. A predicted evaluation value calculation unit 33 calculates a predicted evaluation value from a user who has not evaluated either of the contents X and Z using the similarity between the contents X and Z calculated by the indirect similarity calculation unit 32 and the evaluation values of the contents X and Z. Thus, it is possible to calculate the predicted evaluation values of the contents X and Z which are not directly calculable. Therefore, it becomes possible to further expand the range of contents whose evaluation values are predictable through collaborative filtering.

12 Claims, 8 Drawing Sheets

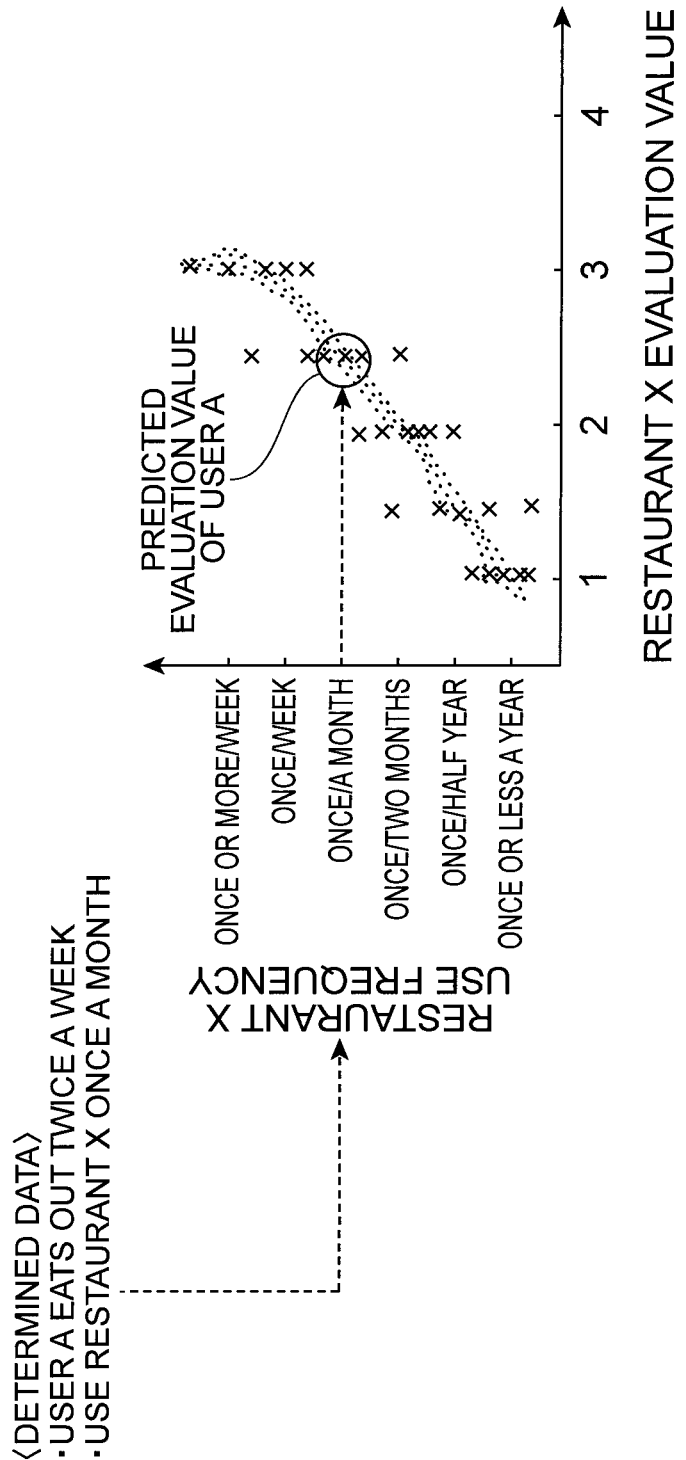

COLLABORATIVE FILTERING USING EVALUATION VALUES OF CONTENTS FROM USERS

CROSS-REFERENCE TO RELATED APPLICATIONS

This application is a national phase application of International Application No. PCT/JP2009/071141, filed Dec. 18, 2009, the content of which is incorporated herein by reference.

TECHNICAL FIELD

The present invention relates to a collaborative filtering system and a collaborative filtering method. In particular, the present invention relates to a collaborative filtering system and a collaborative filtering method which use evaluation values of contents from a plurality of users.

BACKGROUND ART

A collaborative filtering method has been proposed in which information relating to the preferences of many users is accumulated, and using information of another user whose preferences are similar to those of the users, the preferences of the corresponding user are predicted. Collaborative filtering is used for recommendation or personalization. For example, Patent Literature 1 describes an information recommendation method in which, when an arbitrary user votes on an arbitrary item, the evaluation value of the item is substituted in a corresponding cell of an item-user matrix, and the evaluation value is substituted in a cell of another item similar to the item in a pseudo manner. In the information recommendation method of Patent Literature 1, it is assumed that it is possible to recommend an item which may not be recommended because there is no evaluation value.

CITATION LIST

Patent Literature

[Patent Literature 1] Japanese Unexamined Patent Application Publication No. 2005-202540

SUMMARY OF INVENTION

Technical Problem

A car navigation system may give content recommendations, such as shops or facilities, with consideration for the preferences of users using the above-described collaborative filtering. For example, the car navigation system may provide a service which, from a history of a restaurant visited in the past by a user using an automobile and a visit history for the restaurant of another user who has visited the restaurant, recommends a restaurant in tune with the preference of the corresponding user and having not yet been visited by the corresponding user. In this case, the car navigation system may recommend only contents around the sphere of activity of the user.

Examples of contents which are recommended by the car navigation system include restaurants, hotels, retail shops, and the like, and all of them are contents which are related to places. In collaborative filtering, when calculating the similarity between contents, a plurality of users who are evaluating both contents are needed. However, in the contents related to places, when the contents are distant from each other, the number of users who are evaluating both contents decreases, making it difficult to compute the similarity. As a result, the similarity between contents close to each other can be computed, and accordingly, contents which can be recommended by the car navigation system may be limited to contents around the sphere of activity of the user.

A small number of users may score contents, and collaborative filtering may not be operated. That is, as a method of giving contents evaluation values, a method in which users write scores through a website, or a method in which users input scores through the car navigation system after having visited shops or facilities as contents, or the like is considered. In all of these methods, however, a lot of time and effort is expended by the users, and accordingly, it is expected that the evaluation values of the users are difficult to collect.

The invention has been finalized in consideration of such a situation, and an object of the invention is to provide a collaborative filtering system and a collaborative filtering method capable of expanding the range of contents whose evaluation value can be predicted through collaborative filtering. Another object of the invention is to provide a collaborative filtering system and a collaborative filtering method capable of performing prediction through collaborative filtering on the basis of a smaller number of user evaluation values.

Solution to Problem

The invention provides a collaborative filtering system which uses evaluation values of contents from a plurality of users. The system includes a similarity calculation unit which, when there are no evaluation values from at least one user who has evaluated both a first content and a second content, calculates the similarity between the first content and the second content using evaluation values of a third content whose evaluation value is present from at least one user who has evaluated both the first content and the third content and whose evaluation value is present from at least one user who has evaluated both the second content and the third content, and a predicted evaluation value calculation unit which calculates a predicted evaluation value from a user who has not evaluated either of the first content and the second content using the similarity between the first content and the second content calculated by the similarity calculation unit and the evaluation values of the first content and the second content.

When there are no evaluation values from the user who has evaluated both the first and second contents, that is, when the first and second contents are distant from each other, or the like, it may be difficult to directly calculate the similarity between the first content and the second content. At this time, the similarity calculation unit calculates the similarity between the first and second contents using the evaluation values of the third content whose evaluation value is present from at least one user who has evaluated both the first and third contents and whose evaluation value is present from at least one user who has evaluated both the second and third contents. That is, the similarity calculation unit indirectly calculates the similarity between the first and second contents using the third content whose similarity to each of the first and second contents is directly calculable. Thus, it is possible to calculate the similarity between the first and second contents which is not directly calculable.

The predicted evaluation value calculation unit calculates the predicted evaluation value from the user who has not evaluated either of the first content and the second content using the similarity between the first content and the second content calculated by the similarity calculation unit and the evaluation values of the first content and the second content. Thus, it is possible to calculate the predicted evaluation values of the first and second contents which are not directly calculable. Therefore, it becomes possible to further expand the range of contents whose evaluation values are predictable through collaborative filtering.

In this case, it is preferable that, when the number of third contents is N, and for an i-th (where $1 \leq i \leq N$) third content, the similarity between the first content and the third content as a Pearson's product-moment correlation coefficient is expressed by $s(C1,C3i)$ and the similarity between the second content and the third content as a Pearson's product-moment correlation coefficient is expressed by $s(C2,C3i)$, the similarity calculation unit calculates $s(C1,C2)$, which is the similarity between the first content and the second content, by Expression (1) described below.

[Equation 1]

$$s(C1, C2) = \left( \frac{\sum_{i=1}^{N} \sqrt{\frac{1+s(C1, C3i)}{2} * \frac{1+s(C2, C3i)}{2}}}{N} \right) \times 2 - 1 \quad (1)$$

With this configuration, it becomes possible to quantitatively calculate the similarity between the first and second contents on the basis of the similarity between the first and third contents and the similarity between the second and third contents expressed by the Pearson's product-moment correlation coefficients.

The invention also provides a collaborative filtering system which uses evaluation values of contents from a plurality of users. The system includes a predicted evaluation value calculation unit which, for one user who has used a specific content and has not evaluated the specific content, calculates a predicted evaluation value of the specific content from the one user using the use frequency of the specific content of the one user, the use frequency of the specific content of another user who has used the specific content and has evaluated the specific content, and an evaluation value of the specific content from another user.

Alternatively, in the collaborative filtering system, it is preferable that, for one user who has used a specific content and has not evaluated the specific content, the predicted evaluation value calculation unit calculates a predicted evaluation value of the specific content from the one user using the use frequency of the specific content of the one user, the use frequency of the specific content of another user who has used the specific content and has evaluated the specific content, and an evaluation value of the specific content from another user.

There may be one user who has used a specific content and has not evaluated the specific content. In this case, the predicted evaluation value calculation unit uses the use frequency of the specific content of the one user, the use frequency of the specific content of another user who has used the specific content and has evaluated the specific content, and the evaluation value of the specific content from another user. It is considered that the use frequency of a content of each user is correlated with an evaluation value of the corresponding content. For this reason, even when there is no evaluation value from the one user, the predicted evaluation value calculation unit can calculate a predicted evaluation value of the specific content of the one user using the use frequency of the specific content of the one user, the use frequency of the specific content of another user who has used the specific content and has evaluated the specific content, and the evaluation value of the specific content from another user. Therefore, it becomes possible to perform prediction through collaborative filtering on the basis of a smaller number of user evaluation values.

In this case, it is preferable that the predicted evaluation value calculation unit calculates a predicted evaluation value of the specific content from the one user using the use frequency of the specific content of the one user, the use frequency of the specific content of another user whose use frequency of the specific content has a difference within a predetermined threshold value from the use frequency of the specific content of the one user, and an evaluation value of the specific content from another user.

When the difference between the use frequencies of a content is within a predetermined threshold value, it can be estimated that the evaluation values are close to each other. For this reason, the predicted evaluation value calculation unit calculates a predicted evaluation value of the specific content of the one user using the use frequency of the specific content of the one user, the use frequency of the specific content of another user whose use frequency of the specific content has a difference within a predetermined threshold value from the use frequency of the specific content of the one user, and the evaluation value of the specific content from another user, thereby calculating a predicted evaluation value with satisfactory precision.

It is preferable that the predicted evaluation value calculation unit calculates a predicted evaluation value of the specific content of the one user using the use frequency of the specific content of the one user, the use frequency of the specific content of another user whose use frequencies of an unspecified number of contents in a category to which the specific content belongs have a difference within a predetermined threshold value from the use frequencies of the unspecified number of contents of the one user, and an evaluation value of the specific content from another user.

When the difference between the use frequencies of an unspecified number of contents in a category to which the specific content belongs is within a predetermined threshold value, it can be estimated that the evaluation values of the specific content are close to each other. For this reason, the predicted evaluation value calculation unit calculates a predicted evaluation value of the specific content of the one user using the use frequency of the specific content of the one user, the use frequency of the specific content of another user whose use frequencies of an unspecified number of contents in a category to which the specific content belongs have a difference within a predetermined threshold value from the use frequencies of the unspecified number of contents of the one user, and the evaluation value of the specific content from another user, thereby calculating a predicted evaluation value with more satisfactory precision.

It is preferable that the predicted evaluation value calculation unit calculates a predicted evaluation value of the specific content of the one user using the use frequency of the specific content of the one user and either of a median value and an average value of evaluation values of the specific content for the use frequencies of the specific content of a plurality of other users.

The median value or average value of the evaluation values of the specific content for the use frequencies of the specific content of a plurality of other users can be estimated if the correlation between the use frequency and the evaluation value is expressed with satisfactory precision. For this reason, the predicted evaluation value calculation unit calculates a predicted evaluation value of the specific content of the one user using the use frequency of the specific content of the one user and either of the median value and the average value of the evaluation values of the specific content for the use frequencies of the specific content of a plurality of other users, thereby calculating a predicted evaluation value with more satisfactory precision.

It is preferable that the predicted evaluation value calculation unit derives a function of an evaluation value of the specific content for the use frequency of the specific content on the basis of the use frequency of the specific content of another user who has used the specific content and has evaluated the specific content and an evaluation value of the specific content from another user, and calculates a predicted evaluation value of the specific content of the one user using the use frequency of the specific content of the one user and the function.

The function of the evaluation value of the specific content for the use frequency of the specific content derived on the basis of the use frequency of the specific content of another user who has used the specific content and has evaluated the specific content and the evaluation value of the specific content from another user can be estimated if the correlation between the use frequency and the evaluation value is expressed with satisfactory precision. Even when the obtained use frequency and evaluation value are discrete values, it is possible to perform interpolation using the corresponding function. For this reason, the predicted evaluation value calculation unit derives the function of the evaluation value of the specific content for the use frequency of the specific content on the basis of the use frequency of the specific content of another user who has used the specific content and has evaluated the specific content and the evaluation value of the specific content from another user, and calculates the predicted evaluation value of the specific content of the one user using the use frequency of the specific content of the one user and the function, thereby calculating a predicted evaluation value with more satisfactory precision. Even when the use frequency of another user is distant from the use frequency of the one user, it is possible to calculate a predicted evaluation value through interpolation using the function.

The invention also provides a collaborative filtering method which uses evaluation values of contents from a plurality of users. The method includes a similarity calculation step of, when there are no evaluation values from at least one user who has evaluated both a first content and a second content, calculating the similarity between the first content and the second content using evaluation values of a third content whose evaluation value is present from at least one user who has evaluated both the first content and the third content and whose evaluation value is present from at least one user who has evaluated both the second content and the third content, and a predicted evaluation value calculation step of calculating a predicted evaluation value from a user who has not evaluated either of the first content and the second content using the similarity between the first content and the second content calculated in the similarity calculation step and the evaluation values of the first content and the second content.

In this case, it is preferable that, in the similarity calculation step, when the number of third contents is N, and for an i-th (where $1 \le i \le N$) third content, the similarity between the first content and the third content as a Pearson's product-moment correlation coefficient is expressed by $s(C1,C3i)$ and the similarity between the second content and the third content as a Pearson's product-moment correlation coefficient is expressed by $s(C2,C3i)$, $s(C1,C2)$ which is the similarity between the first content and the second content is calculated by Expression (2) described below.

[Equation 2]

$$s(C1, C2) = \left( \frac{\sum_{i=1}^{N} \sqrt{\frac{1+s(C1, C3i)}{2} * \frac{1+s(C2, C3i)}{2}}}{N} \right) \times 2 - 1 \quad (2)$$

The invention also provides a collaborative filtering method which uses evaluation values of contents from a plurality of users. The method includes a predicted evaluation value calculation step of, for one user who has used a specific content and has not evaluated the specific content, calculating a predicted evaluation value of the specific content from the one user using the use frequency of the specific content of the one user, the use frequency of the specific content of another user who has used the specific content and has evaluated the specific content, and an evaluation value of the specific content from another user.

Alternatively, in the above-described collaborative filtering method, in the predicted evaluation value calculation step, for one user who has used a specific content and has not evaluated the specific content, a predicted evaluation value of the specific content from the one user is calculated using the use frequency of the specific content of the one user, the use frequency of the specific content of another user who has used the specific content and has evaluated the specific content, and an evaluation value of the specific content from another user.

In this case, it is preferable that, in the predicted evaluation value calculation step, a predicted evaluation value of the specific content from the one user is calculated using the use frequency of the specific content of the one user, the use frequency of the specific content of another user whose use frequency of the specific content has a difference within a predetermined threshold value from the use frequency of the specific content of the one user, and an evaluation value of the specific content from another user.

It is preferable that, in the predicted evaluation value calculation step, a predicted evaluation value of the specific content of the one user is calculated using the use frequency of the specific content of the one user, the use frequency of the specific content of another user whose use frequencies of an unspecified number of contents in a category to which the specific content belongs have a difference within a predetermined threshold value from the use frequencies of the unspecified number of contents of the one user, and an evaluation value of the specific content from another user.

It is preferable that, in the predicted evaluation value calculation step, a predicted evaluation value of the specific content of the one user is calculated using the use frequency of the specific content of the one user and either of a median value and an average value of evaluation values of the specific content for the use frequencies of the specific content of a plurality of other users.

It is preferable that, in the predicted evaluation value calculation step, a function of an evaluation value of the specific content for the use frequency of the specific content is derived on the basis of the use frequency of the specific content of another user who has used the specific content and has evaluated the specific content and an evaluation value of the specific content from another user, and a predicted evaluation value of the specific content of the one user is calculated using the use frequency of the specific content of the one user and the function.

Advantageous Effects of Invention

According to the collaborative filtering system and the collaborative filtering method of the invention, it becomes possible to further expand the range of contents whose evaluation values are predictable through collaborative filtering. According to the collaborative filtering system and the collaborative filtering method of the invention, it becomes possible to perform prediction through collaborative filtering on the basis of a smaller number of user evaluation values.

BRIEF DESCRIPTION OF DRAWINGS

FIG. 8 is a diagram showing a method of predicting an evaluation value from a target user with reference to an evaluation value from a user whose visit frequency to a corresponding category is equal to that of the target user and whose visit frequency to a corresponding content is equal to that of the target user.

DESCRIPTION OF EMBODIMENTS

Hereinafter, a collaborative filtering system according to an embodiment of the invention will be described with reference to the drawings.

Figure 1:
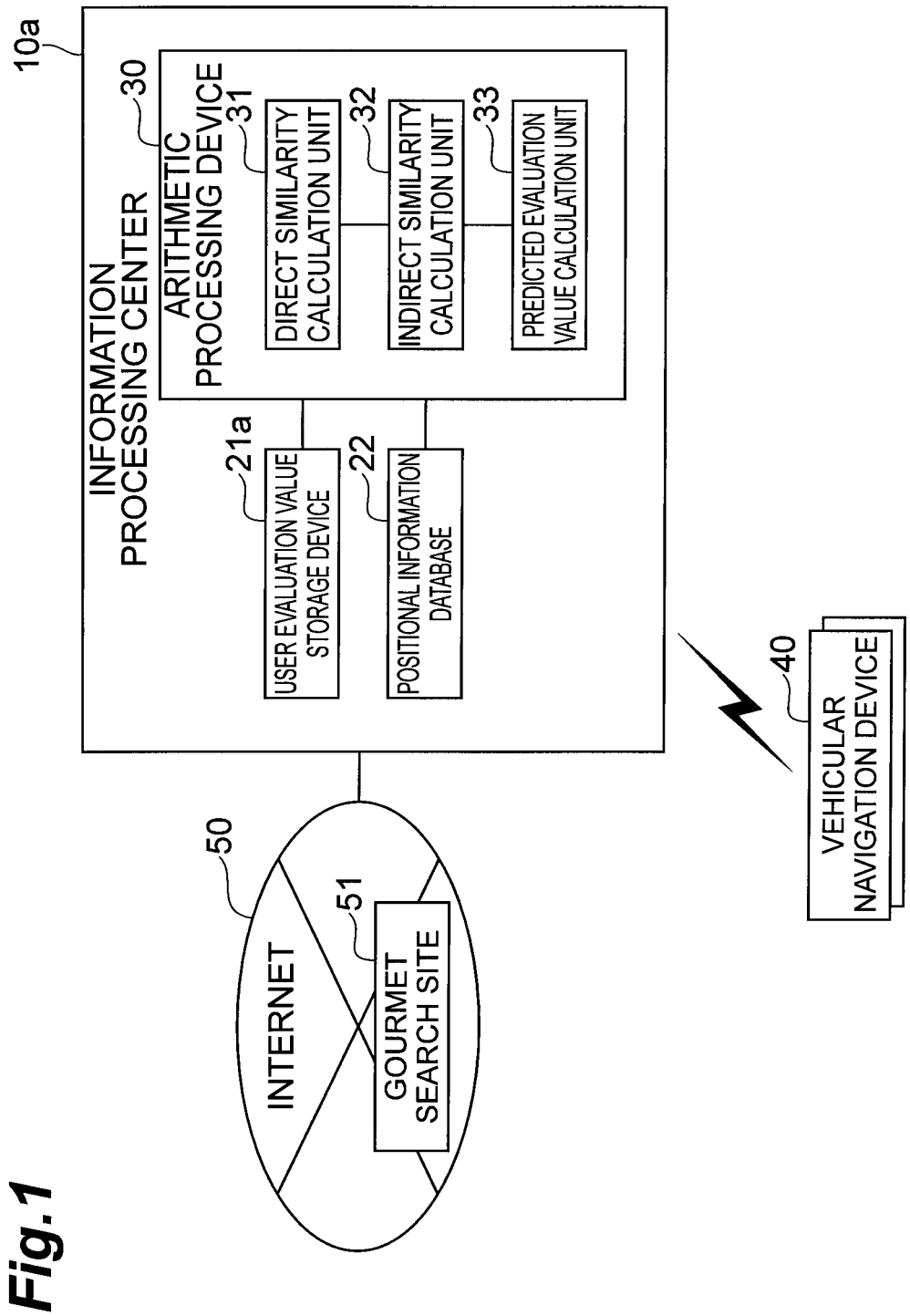
FIG. 1 is a block diagram showing the configuration of a collaborative filtering system according to a first embodiment.

As shown in FIG. 1, a collaborative filtering system according to a first embodiment of the invention includes an information processing center 10a which provides information to vehicular navigation devices 40 mounted in a plurality of vehicles. The information processing center 10a is connectable to the Internet 50 which includes a gourmet search site 51, which provides information relating to shops or facilities of user's favorite foods relationship. The information processing center 10a is a facility which predicts the preferences of each user through collaborative filtering, and gives content recommendations, such as restaurants, hotels, and retail shops, having not been visited by the corresponding user to the user through the vehicular navigation device 40.

The information processing center 10a includes a user evaluation value storage device 21a, a positional information database 22, and an arithmetic processing device 30. The user evaluation value storage device 21a is a database which stores and manages evaluation values of contents from a plurality of users for the contents. The evaluation values stored in the user evaluation value storage device 21a are acquired by transmitting information input to the vehicular navigation device 40 by the user from the vehicular navigation device 40 to the information processing center 10a. The evaluation values from the users stored in the user evaluation value storage device 21a are acquired by collecting information relating to registered users from various sites on the Internet 50.

The positional information database 22 is a database which stores and manages information relating to contents, such as restaurants, hotels, and retail shops, likely to be visited by a user who drives a vehicle in association with POI (Position Of Information) of contents.

The arithmetic processing device 30 is a device which predicts an evaluation value of a content having not been visited by a target user on the basis of information stored in the user evaluation value storage device 21a and the positional information database 22 through collaborative filtering. The arithmetic processing device 30 has a direct similarity calculation unit 31, an indirect similarity calculation unit 32, and a predicted evaluation value calculation unit 33.

The direct similarity calculation unit 31 is a unit which calculates the similarity between two contents on the basis of evaluation values of the two contents from a user using a Pearson's product-moment correlation coefficient or the like. The indirect similarity calculation unit 32 is a unit which, when the similarity between the two contents is not directly calculable, indirectly calculates the similarity between the two contents using another content whose similarity to each of the contents is directly calculable. The predicted evaluation value calculation unit 33 is a unit which predicts an evaluation value to be added to a content having not been visited by the target user on the basis of the similarities between the two contents calculated by the direct similarity calculation unit 31 and the indirect similarity calculation unit 32.

Figure 2:
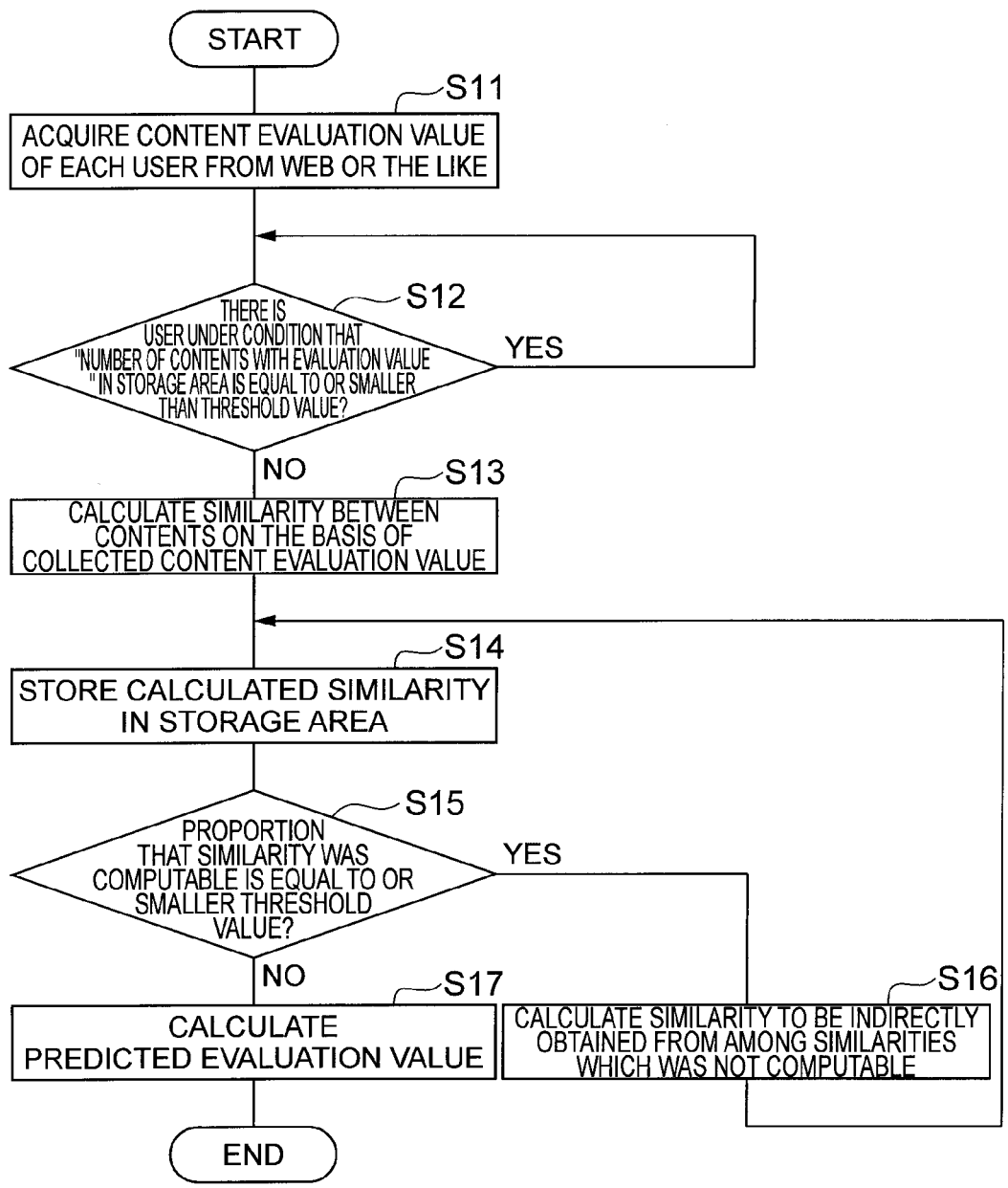
FIG. 2 is a flowchart showing the operation of the collaborative filtering system according to the first embodiment.

Hereinafter, the operation of the collaborative filtering system of this embodiment will be described. As shown in FIG. 2, the user evaluation value storage device 21a of the information processing center 10a acquires evaluation values of contents of users from information transmitted from the vehicular navigation device 40 to the information processing center 10a or information from a website on the Internet 50 (S11). When acquiring the evaluation values of the users from a website, for example, a log of the website on the Internet 50 where restaurants and the like are evaluated is acquired, thereby acquiring the evaluation values of the users.

When there is a user where the number of contents with evaluation values added thereto in the storage area of the user evaluation value storage device 21a is equal to or smaller than a threshold value necessary for collaborative filtering (S12), the evaluation value of the corresponding user is acquired again (S11). When there is no user where the number of contents with evaluation values added thereto stored in the storage area of the user evaluation value storage device 21a is equal to or smaller than the threshold value necessary for collaborative filtering (S12), the direct similarity calculation unit 31 of the arithmetic processing device 30 calculates the similarity between the contents on the basis of the evaluation value of the collected contents from the users (S13).

When there is a user where the evaluation values are added to two contents, it is possible to directly calculate the similarity between the two contents by the Pearson's product-moment correlation coefficient. In this case, it is assumed that there are n users where evaluation values are added to both of two contents X and Y. It is assumed that the evaluation values of the contents X and Y from an i-th user are $rX(i)$ and $rY(i)$. In this case, the direct similarity calculation unit 31 calculates the similarity $s(X,Y)$ between the contents X and Y by Expression (3) described below.

[Equation 3]

$$s(X, Y) = \frac{\sum_{i=1}^{n} (rX(i) - \overline{rX}) * (rY(i) - \overline{rY})}{\sqrt{\sum_{i=1}^{n} (rX(i) - \overline{rX})^2} \sqrt{\sum_{i=1}^{n} (rY(i) - \overline{rY})^2}} \quad (3)$$

Figure 3:
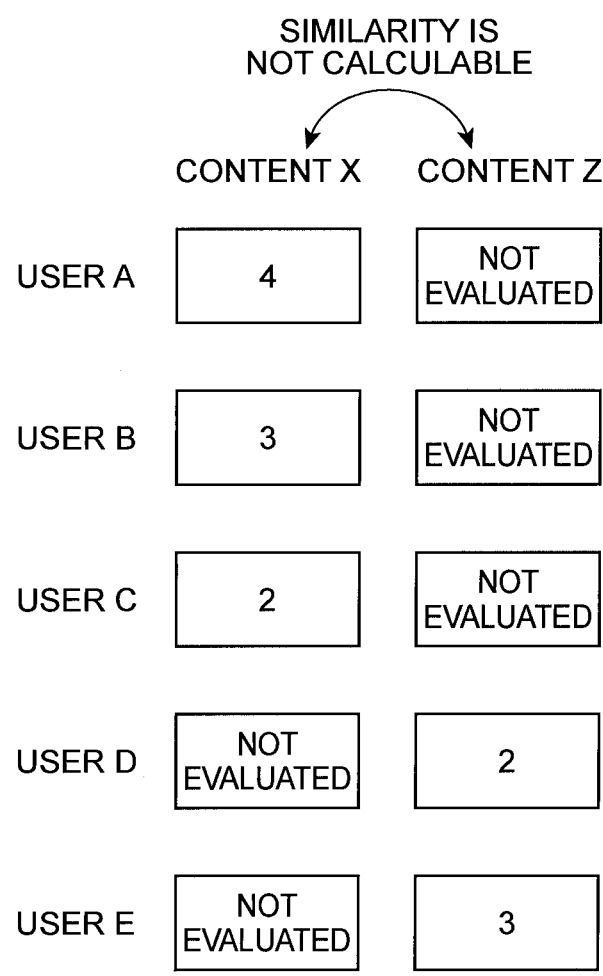
FIG. 3 is a diagram showing contents whose similarity is not directly calculable.

The similarity calculated by the direct similarity calculation unit 31 is stored in the storage area of the predicted evaluation value calculation unit 33 (S14). When the proportion for which the similarity was computable is equal to or smaller than a predetermined threshold value (S15), the indirect similarity calculation unit 32 calculates a similarity, which can be obtained indirectly, from among similarities which are not directly computable (S16). As shown in FIG. 3, with regard to the content X and the content Z, since there are no evaluation values from a user who has evaluated both the contents X and Z, it may be difficult to directly calculate the similarity between the content X and the content Z.

Figure 4:
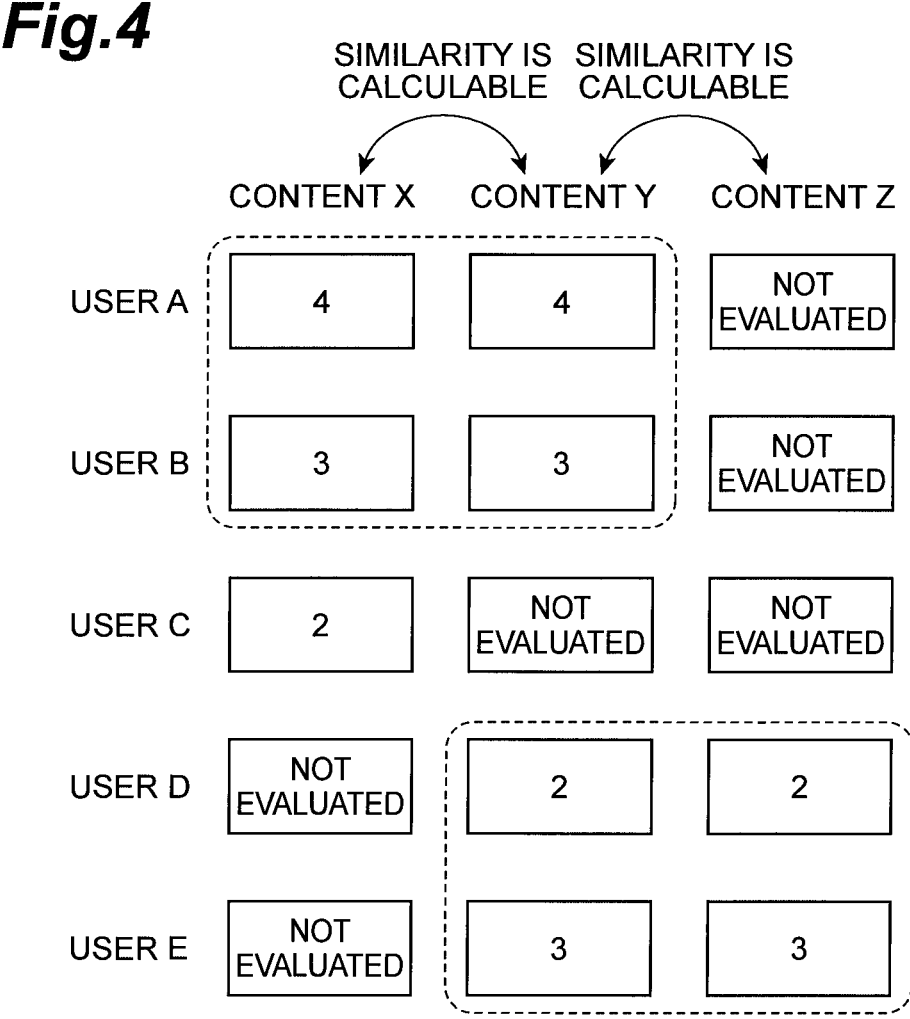
FIG. 4 is a diagram showing a method of indirectly calculating similarity.

As the content Y shown in FIG. 4, when there is a content whose evaluation value is present from a user who has evaluated both the contents X and Y and whose evaluation value is present from a user who has evaluated both the contents Y and Z, the similarity between the contents X and Y and the similarity between the contents Y and Z are calculable. Accordingly, the indirect similarity calculation unit 32 indirectly calculates the similarity between the contents X and Z using the evaluation value of the content Y. The number of contents Y is not limited to one, and a plurality of contents Y are used, thereby improving the similarity calculation precision.

It is assumed that the similarity between the contents X and Y obtained by Expression (3) described above is s(X,Y), and the similarity between the contents Y and Z is s(Y,Z). When the number of contents Y whose evaluation value is present from a user who has evaluated both the contents X and Y and whose evaluation value is present from a user who has evaluated both the contents Y and Z is N, the indirect similarity calculation unit 32 calculates the similarity s(X,Z) between the contents X and Z by Expression (4) described below.

[Equation 4]

$$s(X, Z) = \left( \frac{\sum_{i=1}^{N} \sqrt{\frac{1+s(X, Yi)}{2} * \frac{1+s(Yi, Z)}{2}}}{N} \right) \times 2 - 1 \quad (4)$$

Figure 5:
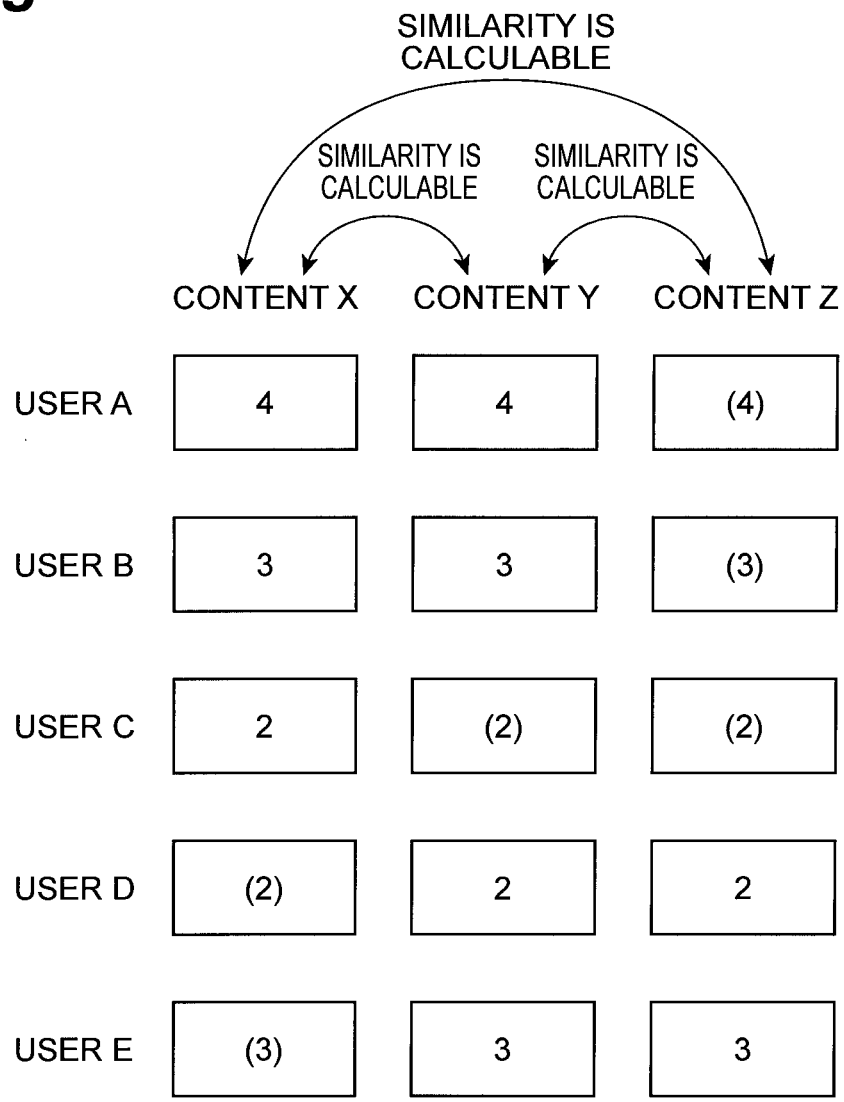
FIG. 5 is a diagram showing evaluation of contents calculated indirectly.

When the proportion for which the similarity was computable exceeds the predetermined threshold value (S15), the predicted evaluation value calculation unit 33 predicts an evaluation value of a content having not been evaluated by a user through an existing collaborative filtering method on the basis of the similarities calculated in Steps S11 to S16 described above and the evaluation value (S17). For example, as shown in FIG. 5, it becomes possible to predict an evaluation value from a user A who has not evaluated the content Z.

As described above, when there are no evaluation values from a user who has evaluated both the contents X and Z, that is, when the contents X and Z are distant from each other, or the like, it may be difficult to directly calculate the similarity between the contents X and Z. In this embodiment, in this case, the indirect similarity calculation unit 32 of the arithmetic processing unit 30 of the information processing center 10a calculates the similarity between the contents X and Z using the evaluation values of the content Y whose evaluation value is present from a user who evaluated both the contents X and Y and whose evaluation value is present from a user who has evaluated both the contents Y and Z. That is, the indirect similarity calculation unit 32 indirectly calculates the similarity between the contents X and Z using the content Y whose similarity to each of the contents X and Z is directly calculable. Therefore, it is possible to calculate the similarity between the contents X and Z which is not directly calculable.

The predicted evaluation value calculation unit 33 calculates a predicted evaluation value from a user who has not evaluated either of the contents X and Z using the similarity between the contents X and Z calculated by the indirect similarity calculation unit 32 and the evaluation values of the contents X and Z. Thus, it is possible to calculate the predicted evaluation values of the contents X and Z which are not directly calculable. Therefore, it becomes possible to further expand the range of contents whose evaluation values are predictable through collaborative filtering. It is also possible to expand the range of contents which can be given recommendations.

In this embodiment, it becomes possible to quantitatively calculate the similarity between the contents X and Z on the basis of the similarity between the contents X and Y and the similarity between the contents Y and Z expressed by the Pearson's product-moment correlation coefficients.

Figure 6:
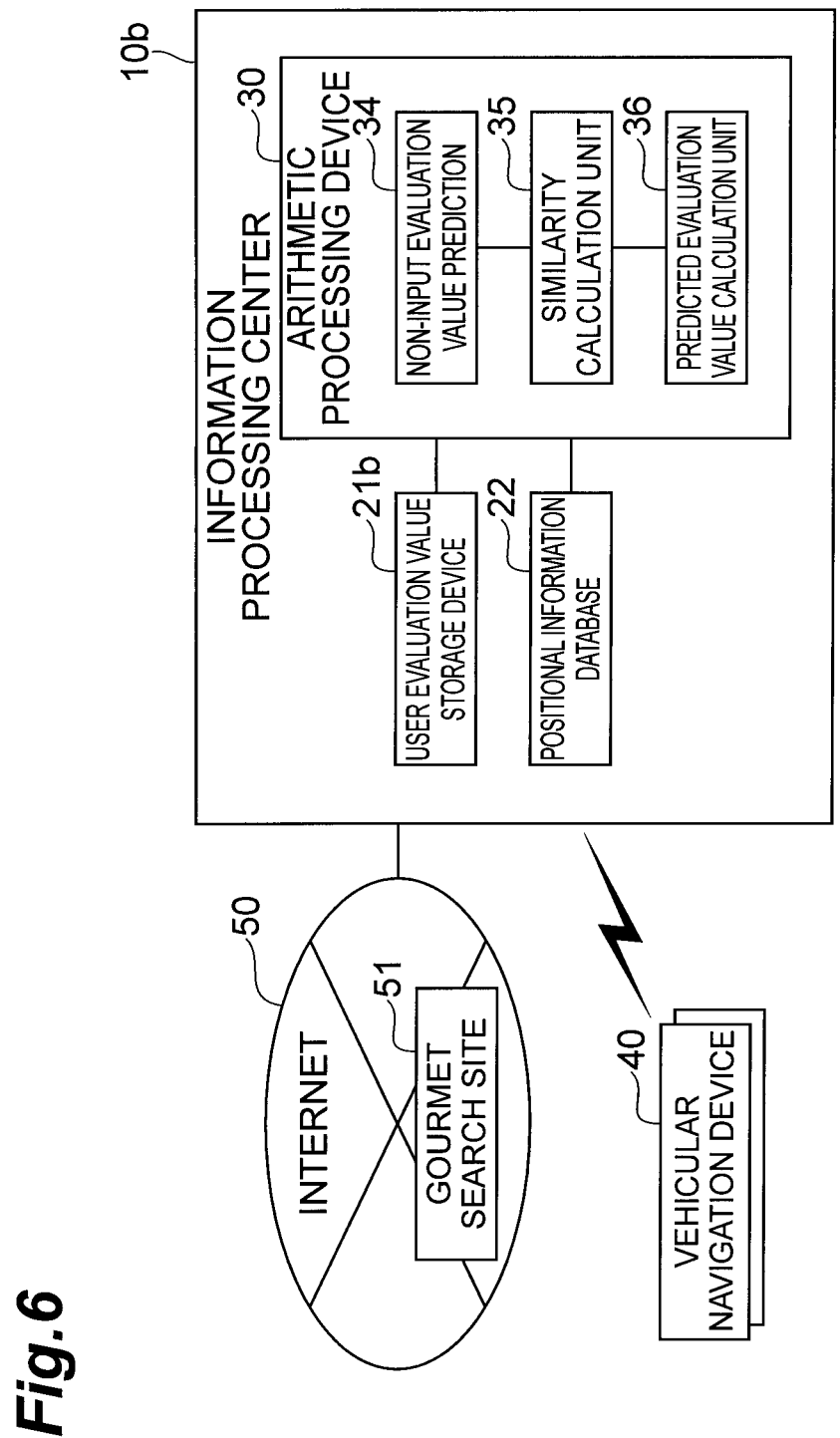
FIG. 6 is a block diagram showing the configuration of a collaborative filtering system according to a second embodiment.
Figure 7:
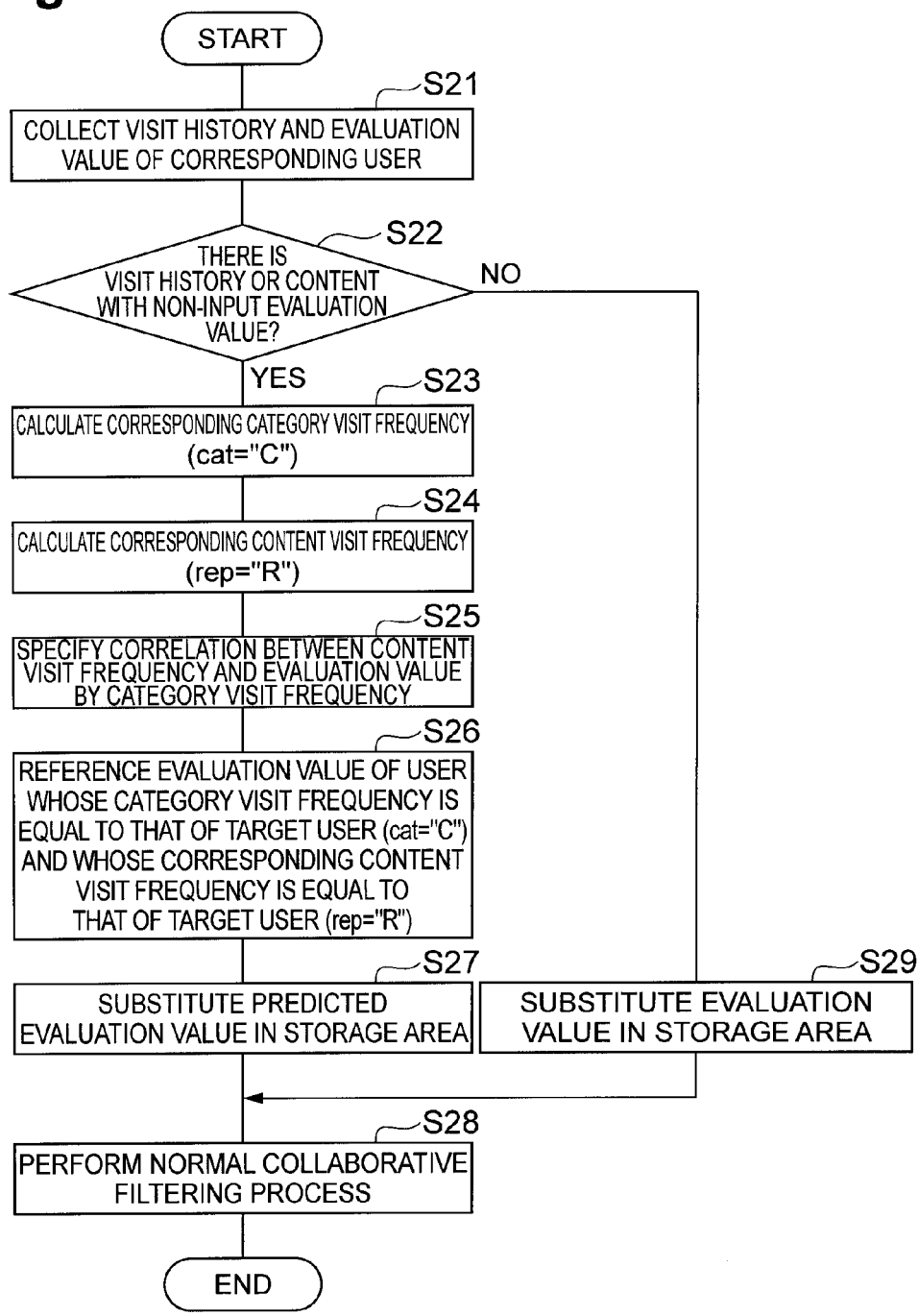
FIG. 7 is a flowchart showing the operation of the collaborative filtering system according to the second embodiment.

Hereinafter, a second embodiment of the invention will be described. As shown in FIG. 6, an information processing center 10b of this embodiment includes a user evaluation value storage device 21b. As in the above-described first embodiment, the user evaluation value storage device 21b stores and manages, in addition to the evaluation values of the contents from each user, visit histories (date and time, places) to the contents of each user. Information relating to the visit histories is transmitted from the vehicular navigation device 40, a mobile terminal, or the like of each user to the information processing center 10b.

An arithmetic processing device 30 of the information processing center 10b of this embodiment includes a non-input evaluation value prediction unit 34, a similarity calculation unit 35, and a predicted evaluation value calculation unit 36. The non-input evaluation value prediction unit 34 is a unit which predicts an evaluation value of a content whose evaluation value is not input by a user and whose visit history is present. As in the direct similarity calculation unit 31 and the indirect similarity calculation unit 32 of the above-described first embodiment, the similarity calculation unit 35 is a unit which obtains the similarity between contents directly or indirectly. As in the predicted evaluation value calculation unit 33 of the above-described first embodiment, the predicted evaluation value calculation unit 36 is a unit which predict an evaluation value to be added to a content having not been visited by a target user on the basis of the similarities between two contents calculated by the direct similarity calculation unit 31 and the indirect similarity calculation unit 32.

Hereinafter, the operation of the collaborative filtering system of this embodiment will be described. As in the above-described first embodiment, the user evaluation value storage device 21b of the information processing center 10b collects the visit histories to the contents of the target user and the evaluation values of the contents (S21).

When there is a content for which the visit history of a user is present and whose evaluation value is not input (S22), the non-input evaluation value prediction unit 34 of the arithmetic processing device 30 calculates a visit frequency to a category including the corresponding content as cat="C" with reference to information stored in the user evaluation value storage device 21b (S23). For example, if it is assumed that a content which has been visited by the user A and whose evaluation value is not input is a restaurant X, a category to which the restaurant X belongs corresponds to "dining facility", "play facility", "purchase facility", or the like. The non-input evaluation value prediction unit 34 calculates the visit frequency of the user A, for example, to "dining facility" or the like.

The non-input evaluation value prediction unit 34 calculates a visit frequency to the corresponding content as rep="R" with reference to information stored in the user evaluation value storage device 21b (S24). For example, when a content which has been visited by the user A and whose evaluation value is not input is the restaurant X, the visit frequency of the user A to the restaurant is calculated.

The non-input evaluation value prediction unit 34 specifies the correlation between a visit frequency to a content and an evaluation value by visit frequency to a category (S25). If it is assumed that the visit frequency of the user A to the category "dining facility" to which the restaurant X belongs is twice a week, as shown in FIG. 8, the non-input evaluation value prediction unit 34 complies statistics about the use frequencies and the evaluation values of the restaurant X from other users who are using "dining facility" twice a week. In this case, the non-input evaluation value prediction unit 34 performs a statistical process for each use frequency of the restaurant X, and obtains a median value, an average value, or the like of the evaluation values, thereby specifying the correlation of the visit frequency to the content and the evaluation value. The non-input evaluation value prediction unit 34 obtains an approximate expression of a function of the use frequency of the restaurant X and the evaluation value, thereby specifying the correlation between the visit frequency to the content and the evaluation value.

Although in this embodiment, an example has been described where the correlation between a visit frequency to a content or a category and an evaluation value is specified, the correlation between a lot of information, such as commonality of season or time zone when a category or a content is visited, and an evaluation value is specified, thereby improving the prediction precision of an evaluation value. For example, the correlation between whether or not a category or a content is input to the bookmark of the vehicular navigation device 40 or a mobile terminal of the user, or an access situation on a website and an evaluation value may be obtained.

The non-input evaluation value prediction unit 34 references an evaluation value of a user whose visit frequency to a category is equal to that of the target user (cat="C") and whose visit frequency to a content is equal to that of the target user (rep="R") (S26) using the correlation between the visit frequency to the category or content and the evaluation value specified in Step 25. For example, an evaluation value of a user whose visit frequency to the category "dining facility" is twice a week the same as the user A and whose visit frequency to the restaurant X is once a month the same as the user A is "2.5". Accordingly, the non-input evaluation value prediction unit 34 can predict the evaluation value of the restaurant X from the user A as 2.5. The visit frequencies of a category or the visit frequencies of a content may not completely coincide with each other, and if the difference is within a range of a predetermined threshold value, they can be regarded as the same.

The non-input evaluation value prediction unit 34 substitutes the predicted evaluation value predicted in S26 in the storage area (S27). The non-input evaluation value prediction unit 34 performs a normal collaborative filtering process on the basis of the predicted evaluation value (S28). In Step S22, when there is no content for which the visit history of a user is present and whose evaluation value is not input, the non-input evaluation value prediction unit 34 substitutes the evaluation value stored in the user evaluation value storage device 21b in the storage area (S29).

As described above, there may be the user A who has used the restaurant X and has not evaluated the restaurant X. In this embodiment, in this case, the non-input evaluation value prediction unit 34 of the arithmetic processing unit 30 of the information processing center 10b uses the use frequency of the restaurant X of the corresponding user A, the use frequency of the restaurant X of another user who has used the restaurant X and has evaluated the restaurant X, and the evaluation value of the restaurant X from another user. It is considered that the use frequency of the restaurant of each user is correlated with the evaluation value of the corresponding restaurant X. For this reason, even when there is no evaluation value from the user A, the non-input evaluation value prediction unit 34 can calculate a predicted evaluation value of the restaurant X from the user A using the use frequency of the restaurant X of the user A, the use frequency of the restaurant X of another user who has used the restaurant X and has evaluated the restaurant X, and the evaluation value of the restaurant from another user. Therefore, it becomes possible to perform prediction through collaborative filtering on the basis of a smaller number of user evaluation values.

In particular, when the difference between the use frequencies of the restaurant X is within the predetermined threshold value, it can be estimated that the evaluation values are close to each other. For this reason, the non-input evaluation value prediction unit 34 calculates a predicted evaluation value of the restaurant X from the user A using the use frequency of the restaurant X of the user A, the use frequency of the restaurant X of another user whose use frequency of the restaurant X has a difference within a predetermined threshold value from the use frequency of the restaurant X of the user A, and the evaluation value of the restaurant X from another user, thereby calculating a predicted evaluation value with satisfactory precision.

When the difference between the use frequencies of an unspecified number of contents in the category "dining facility" to which the restaurant X belongs is within a predetermined threshold value, it can be estimated that the evaluation values of the restaurant X are close to each other. For this reason, the non-input evaluation value prediction unit 34 calculates a predicted evaluation value of the restaurant X from the user A using the use frequency of the restaurant X of the user A, the use frequency of the restaurant X of another user whose use frequencies of an unspecified number of contents in the category "dining facility" to which the restaurant X belongs have a difference within a predetermined threshold value from the use frequencies of the unspecified number of contents of the user A, and the evaluation value of the restaurant X from another user, thereby calculating a predicted evaluation value with more satisfactory precision.

The median value or the average value of the evaluation values of the restaurant X for the use frequencies of the restaurant X of a plurality of other users can be estimated if the correlation between the use frequency and the evaluation value is expressed with satisfactory precision. For this reason, the non-input evaluation value prediction unit 34 calculates a predicted evaluation value of the restaurant X of the user A using the use frequency of the restaurant X of the user A and either of the median value and the average value of the evaluation values of the restaurant X for the use frequencies of the restaurant X of a plurality of other users, thereby calculating a predicted evaluation value with more satisfactory precision.

The function of the use frequency of the restaurant X and the evaluation value of the restaurant X derived on the basis of the use frequency of the restaurant X of another user who has uses the restaurant X and has evaluated the restaurant X and the evaluation value of the restaurant X from another user can be estimated if the correlation between the use frequency and the evaluation value is expressed with satisfactory precision. Accordingly, even when the obtained use frequency and the evaluation value are discrete values, it is possible to perform interpolation using the corresponding function. For this reason, the non-input evaluation value prediction unit 34 derives the function of the use frequency of the restaurant X and the evaluation value of the restaurant X on the basis of the use frequency of the restaurant X of another user who has used the restaurant X and has evaluated the restaurant X and the evaluation value of the restaurant X from another user, and calculates a predicted evaluation value of the restaurant X from the user A using the use frequency of the specific content of the user A and the function, thereby calculating a predicted evaluation value with more satisfactory precision. Even when the use frequency of another user and the use frequency of the user A are distant from each other, it is possible to calculate a predicted evaluation value through interpolation using the function.

Although the embodiments of the invention have been described, the invention is not limited to the foregoing embodiments, and various modification may be made. For example, in the foregoing embodiments, description has been provided focusing on a form in which a content is a shop, a facility, or the like which is related to a place, and a user who gets in a vehicle is given recommendations through the vehicular navigation device 40. However, a form in which evaluation values of other contents whose evaluation values are obtained with difficulty still falls within the scope of the invention, and produces effects.

INDUSTRIAL APPLICABILITY

The invention can provide a collaborative filtering system and a collaborative filtering method capable of further expanding the range of contents whose evaluation values are predictable through collaborative filtering. The invention can also provide a collaborative filtering system and a collaborative filtering method capable of performing prediction through collaborative filtering on the basis of a smaller number of user evaluation values.

REFERENCE SIGNS LIST

10a, 10b: information processing center
21a, 21b: user evaluation value storage device
22: positional information database
30: arithmetic processing device
31: direct similarity calculation unit
32: indirect similarity calculation unit
33: predicted evaluation value calculation unit
34: non-input evaluation value prediction unit
35: similarity calculation unit
36: predicted evaluation value calculation unit
40: vehicular navigation device
50: Internet
51: gourmet search site

The invention claimed is:

1. A collaborative filtering system which uses evaluation values of contents from a plurality of users, the system comprising:
an arithmetic processing device comprising:
a similarity calculation unit which, when there are no evaluation values from at least one user who has evaluated both a first content and a second content, calculates the similarity between the first content and the second content using evaluation values of a third content whose evaluation value is present from at least one user who has evaluated both the first content and the third content and whose evaluation value is present from at least one user who has evaluated both the second content and the third content; and
a predicted evaluation value calculation unit which calculates a predicted evaluation value from a user who has not evaluated either of the first content and the second content using the similarity between the first content and the second content calculated by the similarity calculation unit and the evaluation values of the first content and the second content,
wherein, for one user who has used a specific content and has not evaluated the specific content, the predicted evaluation value calculation unit calculates a predicted evaluation value of the specific content from the one user using the use frequency of the specific content of the one user, the use frequency of the specific content of another user who has used the specific content and has evaluated the specific content, and an evaluation value of the specific content from another user.

2. The system according to claim 1,
wherein, when the number of third contents is N, and for an i-th (where $1 \leq i \leq N$) third content, the similarity between the first content and the third content as a Pearson's product-moment correlation coefficient is expressed by s(C1,C3i) and the similarity between the second content and the third content as a Pearson's product-moment correlation coefficient is expressed by s(C2,C3i), the similarity calculation unit calculates s(C1,C2), which is the similarity between the first content and the second content, by Expression (1)

[Equation 1]

$$s(C1, C2) = \left( \frac{\sum_{i=1}^{N} \sqrt{\frac{1+s(C1, C3i)}{2} * \frac{1+s(C2, C3i)}{2}}}{N} \right) \times 2 - 1 \quad (1)$$

3. The system according to claim 1,
wherein the predicted evaluation value calculation unit calculates a predicted evaluation value of the specific content from the one user using the use frequency of the specific content of the one user, the use frequency of the specific content of another user whose use frequency of the specific content has a difference within a predetermined threshold value from the use frequency of the specific content of the one user, and an evaluation value of the specific content from another user.

4. The system according to claim 1,
wherein the predicted evaluation value calculation unit calculates a predicted evaluation value of the specific content of the one user using the use frequency of the specific content of the one user, the use frequency of the specific content of another user whose use frequencies of an unspecified number of contents in a category to which the specific content belongs have a difference within a predetermined threshold value from the use frequencies of the unspecified number of contents of the one user, and an evaluation value of the specific content from another user.

5. The system according to claim 1,
wherein the predicted evaluation value calculation unit calculates a predicted evaluation value of the specific content of the one user using the use frequency of the specific content of the one user and either of a median value and an average value of evaluation values of the specific content for the use frequencies of the specific content of a plurality of other users.

6. The system according to claim 1,
wherein the predicted evaluation value calculation unit derives a function of an evaluation value of the specific content for the use frequency of the specific content on the basis of the use frequency of the specific content of another user who has used the specific content and has evaluated the specific content and an evaluation value of the specific content from another user, and calculates a predicted evaluation value of the specific content of the one user using the use frequency of the specific content of the one user and the function.

7. A collaborative filtering method which uses evaluation values of contents from a plurality of users, the method comprising:
a similarity calculation step of, when there are no evaluation values from at least one user who has evaluated both a first content and a second content, calculating the similarity between the first content and the second content using evaluation values of a third content whose evaluation value is present from at least one user who has evaluated both the first content and the third content and whose evaluation value is present from at least one user who has evaluated both the second content and the third content; and
a predicted evaluation value calculation step of calculating a predicted evaluation value from a user who has not evaluated either of the first content and the second content using the similarity between the first content and the second content calculated in the similarity calculation step and the evaluation values of the first content and the second content,
wherein, in the predicted evaluation value calculation step, for one user who has used a specific content and has not evaluated the specific content, a predicted evaluation value of the specific content from the one user is calculated using the use frequency of the specific content of the one user, the use frequency of the specific content of another user who has used the specific content and has evaluated the specific content, and an evaluation value of the specific content from another user.

8. The method according to claim 7,
wherein, in the similarity calculation step, when the number of third contents is N, and for an i-th (where $1 \leq i \leq N$) third content, the similarity between the first content and the third content as a Pearson's product-moment correlation coefficient is expressed by $s(C1,C3i)$ and the similarity between the second content and the third content as a Pearson's product-moment correlation coefficient is expressed by $s(C2,C3i)$, $s(C1,C2)$ which is the similarity between the first content and the second content is calculated by Expression (2)

[Equation 2]

$$s(C1, C2) = \left( \frac{\sum_{i=1}^{N} \sqrt{\frac{1+s(C1, C3i)}{2} * \frac{1+s(C2, C3i)}{2}}}{N} \right) \times 2 - 1 \quad (2)$$

9. The method according to claim 7,
wherein, in the predicted evaluation value calculation step, a predicted evaluation value of the specific content from the one user is calculated using the use frequency of the specific content of the one user, the use frequency of the specific content of another user whose use frequency of the specific content has a difference within a predetermined threshold value from the use frequency of the specific content of the one user, and an evaluation value of the specific content from another user.

10. The method according to claim 7,
wherein, in the predicted evaluation value calculation step, a predicted evaluation value of the specific content of the one user is calculated using the use frequency of the specific content of the one user, the use frequency of the specific content of another user whose use frequencies of an unspecified number of contents in a category to which the specific content belongs have a difference within a predetermined threshold value from the use frequencies of the unspecified number of contents of the one user, and an evaluation value of the specific content from another user.

11. The method according to claim 7,
wherein, in the predicted evaluation value calculation step, a predicted evaluation value of the specific content of the one user is calculated using the use frequency of the specific content of the one user and either of a median value and an average value of evaluation values of the specific content for the use frequencies of the specific content of a plurality of other users.

12. The method according to claim 7,
wherein, in the predicted evaluation value calculation step, a function of an evaluation value of the specific content for the use frequency of the specific content is derived on the basis of the use frequency of the specific content of another user who has used the specific content and has evaluated the specific content and an evaluation value of the specific content from another user, and a predicted evaluation value of the specific content of the one user is calculated using the use frequency of the specific content of the one user and the function.

\* \* \* \* \*